(12) United States Patent
Pfaeffle et al.

(45) Date of Patent: Sep. 13, 2011
(10) Patent No.: US 8,015,805 B2

(54) METHOD FOR REGENERATING AN EXHAUST AFTERTREATMENT SYSTEM

(75) Inventors: Andreas Pfaeffle, Wuestenrot (DE); Ralf Wirth, Leonberg (DE); Marcel Wuest, Korntal (DE); Hartmut Lueders, Oberstenfeld (DE); Thomas Hauber, Altbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/007,696

(22) Filed: Dec. 8, 2004

(65) Prior Publication Data

US 2005/0166580 A1    Aug. 4, 2005

(30) Foreign Application Priority Data

Feb. 2, 2004   (DE) .................... 10 2004 005 072

(51) Int. Cl.
   *F01N 3/00* (2006.01)
(52) U.S. Cl. ........... 60/295; 60/274; 60/277; 60/285; 60/297; 701/23; 701/25; 701/207; 701/213
(58) Field of Classification Search ............ 60/274, 60/276, 277, 286, 295, 297, 300; 701/23, 701/25, 201, 202, 208, 209, 213, 207
See application file for complete search history.

(56) References Cited

U.S. PATENT DOCUMENTS

| | | | | |
|---|---|---|---|---|
| 6,021,638 A * | 2/2000 | Hochmuth | | 60/274 |
| 6,032,461 A * | 3/2000 | Kinugasa et al. | | 60/295 |
| 6,199,001 B1 * | 3/2001 | Ohta et al. | | 701/51 |
| 6,216,676 B1 * | 4/2001 | Gotoh et al. | | 123/568.21 |
| 6,230,089 B1 * | 5/2001 | Lonn et al. | | 701/48 |
| 6,314,347 B1 * | 11/2001 | Kuroda et al. | | 701/22 |
| 6,370,868 B1 * | 4/2002 | Kolmanovsky et al. | | 60/274 |
| 6,459,967 B1 * | 10/2002 | Otto | | 701/29 |
| 6,470,675 B1 * | 10/2002 | Lewis et al. | | 60/285 |
| 6,845,314 B2 * | 1/2005 | Fosseen | | 701/114 |
| 6,847,892 B2 * | 1/2005 | Zhou et al. | | 701/213 |
| 6,910,329 B2 * | 6/2005 | Bunting et al. | | 60/297 |
| 7,043,903 B2 * | 5/2006 | Onodera et al. | | 60/295 |
| 2003/0135323 A1 * | 7/2003 | Votsmeier et al. | | 701/115 |
| 2004/0117083 A1 * | 6/2004 | Graf et al. | | 701/35 |

FOREIGN PATENT DOCUMENTS

| | | |
|---|---|---|
| DE | 199 48 236 | 4/2001 |
| EP | 0 859 132 | 4/1998 |
| EP | 1 316 705 | 6/2003 |
| FR | 2 863 005 | 6/2005 |
| JP | 11-122125 | 4/1999 |
| JP | 11-122201 | 4/1999 |
| JP | 2003-511601 | 3/2003 |
| JP | 2003-314250 | 11/2003 |
| JP | 2005214096 A * | 8/2005 |
| WO | WO 01/25606 | 4/2001 |

* cited by examiner

*Primary Examiner* — Tu M Nguyen
(74) *Attorney, Agent, or Firm* — Kenyon & Kenyon LLP

(57) ABSTRACT

A method for regenerating an exhaust aftertreatment system, in particular a particulate filter of an internal combustion engine, situated in a vehicle, having regeneration cycles controlled by a control device. An optimized regeneration of the exhaust aftertreatment system is achieved by supplying information relating to the travel route to the control device and controlling the regeneration cycles, taking the information into consideration.

7 Claims, 1 Drawing Sheet

METHOD FOR REGENERATING AN EXHAUST AFTERTREATMENT SYSTEM

FIELD OF THE INVENTION

The present invention relates to a method for regenerating an exhaust aftertreatment system, in particular a particulate filter of an internal combustion engine, situated in a vehicle, having regeneration cycles controlled by a control device.

BACKGROUND INFORMATION

A method for regenerating an exhaust aftertreatment system is carried out as a function of defined engine operating states based on parameters which are relevant in this respect. The regeneration cycles include the actual regeneration operation and a specific period between the individual regeneration operations. The regeneration in part requires changes in the engine operating state in the particular instantaneous engine operating point characterized by load torque and rotational speed. These may be, for example, measures to increase the exhaust gas temperature during the thermal diesel particulate filter regeneration. Measures to increase the exhaust gas temperature are, for example, retarding the start of injection of the main injection or an additional fuel injection in the same working cycle after the main injection as a postinjection. Under unfavorable operating conditions, increased exhaust gas emissions may occur during the regeneration.

After the regeneration is initiated, depending on the design of the exhaust aftertreatment system, specific engine operating points should no longer be started during the course of the regeneration. For example, during the thermal regeneration of diesel particulate filters, a transition into overrun condition or idling after the start of regeneration is detrimental to the completeness of the soot burn-off or will even damage the system if the filter is too heavily loaded.

After the characteristic ignition temperature is exceeded in the diesel particulate filter, an exothermic process accompanied by a temperature increase occurs in the filter. The magnitude of the temperature increase may depend, among other things, on the composition and quantity of the reaction gas or the exhaust gas (oxygen concentration, exhaust gas mass flow, the particulate mass in the filter and the exhaust gas temperature upstream of the filter. When a transition is made into overrun operation or idling, there is the danger that if the filter is heavily loaded, the exhaust gas mass flow diminishes, while the partial pressure of oxygen simultaneously increases. This may result in a temperature increase in the diesel particulate filter, which may cause its destruction. Other relationships apply, for example, to NOx desorption exhaust aftertreatment systems in accumulator-type catalytic converters.

The particulate filter systems developed in recent years make it possible to strongly reduce particle emissions in diesel vehicles. The reduction in emissions amounts, for example, to more than 97% of the particulate mass. At certain time intervals, it is necessary to empty the particulate filter of its soot deposits so that the flow resistance does not reduce engine performance. To that end, the soot layer is burned off, forming carbon dioxide ($CO_2$) and water vapor. Exhaust gas temperatures exceeding, for example, 550° C. are required for burning the soot. Such temperatures are not reliably reached in vehicle operation, making additional measures necessary for the regeneration. Basically, it is possible to distinguish between active and passive systems for the regeneration. Even when using systems through which the soot ignition temperature is reduced, such as a catalytic soot filter, a CRT system or catalytic fuel additives, active measures must be employed to be able to implement reliable filter operation.

The CRT system functions as soon as exhaust gas temperatures greater than 250° C. are reached. However, it is not possible to always ensure this in modern diesel vehicles, making it possible for excess particulate matter to accumulate in the filter, resulting in high backpressures and a reduction of performance in the internal combustion engines. In such cases, normally active systems must be switched on in order to reach the necessary exhaust gas temperatures. However, all such measures require additional energy (heat) which is ultimately generated from the fuel (e.g., electrical energy from the battery to generate heat in a heating element, a fuel burner, postinjection of fuel into the engine combustion chamber). The exhaust emission control system thus increases the fuel consumption of the vehicle. Even in other exhaust emission control systems or exhaust aftertreatment systems such as the accumulator-type NOx catalytic converter, specific temperature ranges are required in order to be able to ensure the function (regeneration). The regeneration measures, i.e., among other things, the selection of the point in time at which a regeneration of a particulate filter is initiated, are presently oriented, for example, to the distance traveled (e.g., after 400 to 700 km) and the pressure differential across the particulate filter. As soon as the pressure differential has increased by a specific value or a specific distance has been traveled, the regeneration is initiated if specific preconditions have been met which make a regeneration possible, such as engine temperature, exhaust gas temperature or the like. In general, in previous exhaust aftertreatment systems, a regeneration is implemented as a function of the load condition and the operating state of the internal combustion engine.

With consideration of the relationships explained above, an object of the present invention is to provide a method for regenerating an exhaust aftertreatment system via which the danger of harmful effects on the exhaust aftertreatment system and the internal combustion engine is minimized while maintaining optimum exhaust gas values.

SUMMARY OF THE INVENTION

This objective is achieved according to the present invention. Information relating to the travel distance is supplied to the control device and the regeneration cycles are controlled, taking the information into consideration.

The utilization of information relating to the travel distance for controlling the regeneration cycles makes it possible in a foresighted strategy to avoid, for example, the necessity of ending a regeneration operation of a particulate filter extending for several minutes as a consequence of unfavorable engine operating parameters or the possibility of damage to the aftertreatment system. The regeneration, which as a rule is associated with worse exhaust gas values than in normal operation, may also be adapted to external requirements, e.g., prevented in a tunnel.

An advantageous utilization of information, accompanied by low installation expenditure, is achieved in that the information is supplied by a global positioning system, a traffic telematics system, a travel distance computer and/or a navigation system.

The expenditure from the standpoint of control engineering may be kept low, for example, by extracting the information from more general travel distance data using the control device or an upstream computational unit.

Different possibilities for providing the information concerning the travel distance include determining the information and/or the travel distance data before the start of a trip or in real time during the trip.

Advantageous measures for the control strategy include determining in the control device if a regeneration operation provided for based on a regeneration request of an exhaust aftertreatment system is given priority or delayed as a function of the information and, if necessary, modifying the regeneration cycle as a function of the result of this determination.

As an alternative or in addition, it may be determined in the control device as a function of the information if a modified regeneration operation (regeneration process, regeneration phase) is performed. Different modified regeneration operations and accordingly regeneration cycles as well may, for example, be instantaneously determined by a real time calculation corresponding to a predetermined model or stored and, based on specific criteria, retrieved from the memory to implement the regeneration.

Another advantageous measure for implementing the method results from processing the information or travel distance data and routing it to the control device via a bus so that it is possible, for example, to supply relevant data via an existing CAN bus. For an advantageous control strategy, it is further favorable that the information contains data concerning uphill grades, downhill grades, exhaust gas-critical stretches and/or traffic jams.

Additional measures contributing to an optimization of the method are to include the higher temperature of the internal combustion engine in an uphill grade for a regeneration operation, and/or delaying, giving priority to and/or shortening a regeneration operation based on an optimization strategy in the case of an approaching downhill grade or an exhaust gas-critical stretch.

DETAILED DESCRIPTION

Figure 1:
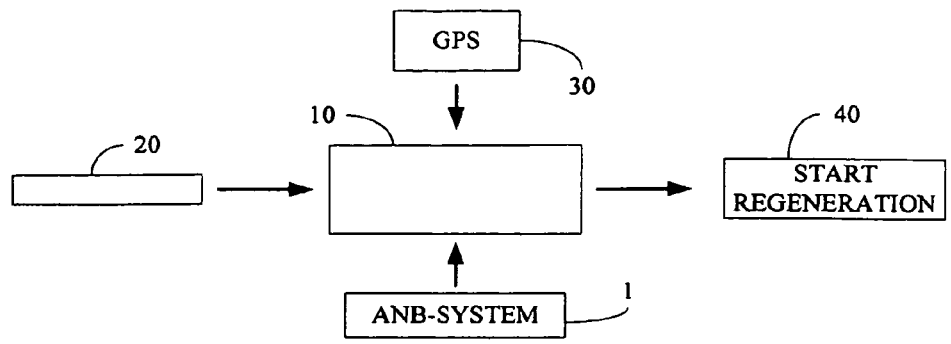
FIG. 1 shows a schematic block diagram of a system for implementing the method for regenerating an exhaust aftertreatment system.

According to FIG. 1, for the regeneration, in addition to the signals, i.e., data of an exhaust aftertreatment system 1, information from a global positioning system (GPS) 30 and/or a traffic telematics system 20 relating to the travel distance by the vehicle is supplied to a control device 10 having a state machine in order to start a regeneration of the aftertreatment system via a suitable device 40. The exhaust aftertreatment system to be regenerated is associated with an internal combustion engine situated in a vehicle.

Using the information from global positioning system 30 or traffic telematics system 20 or a similar system including a travel distance computer and/or navigation system, supplied to control device 10, it is possible to create a foresighted regeneration strategy as a function of the travel distance, which is determined in control device 10 in conjunction with the data of exhaust aftertreatment system 1. The regeneration strategy is directed to avoiding regeneration when it would coincide with unfavorable engine operating states and/or external conditions. The information supplied, for example, by global positioning system 30 and/or traffic telematics system 20 relates, for example, to traffic disturbances which may result in stopping the vehicle and thus a transition to lower idling. To this end, it is possible, for example, before starting a regeneration of a diesel particulate filter situated in the exhaust aftertreatment system, to compare the information concerning the present location and the direction of travel from global positioning system 30 with the information of traffic telematics system 20 concerning traffic disturbances. It is thus possible to prevent regeneration of the particulate filter from being initiated in operation shortly before approaching a traffic disturbance and starting the exothermic function described above. It is also conceivable to influence the regeneration characteristics or the regeneration cycle via the regeneration operation as is provided by exhaust aftertreatment system 1 solely as a function of the information of global positioning system 30, such as, for example, the prevention of a regeneration shortly before entering a road tunnel or a parking garage.

Due to route (distance) time constants of exhaust aftertreatment system 1, regeneration times, i.e., durations of regeneration operations, are often required to be in the minutes range. However, dynamic changes in the engine operating state normally occur with significantly lower time constants. In order to be able to completely perform regenerations or to prevent critical system states, the information relating to the travel distance is suitably selected with foresight.

In doing so, the information from global positioning system 30, traffic telematics system 20 or a travel distance computer or the like for control device 10, for example, of an engine control unit, is routed in suitable form, for example, via a CAN bus and transferred in this form. In this connection, it is not absolutely necessary to transfer the complete information.

Figure 2:
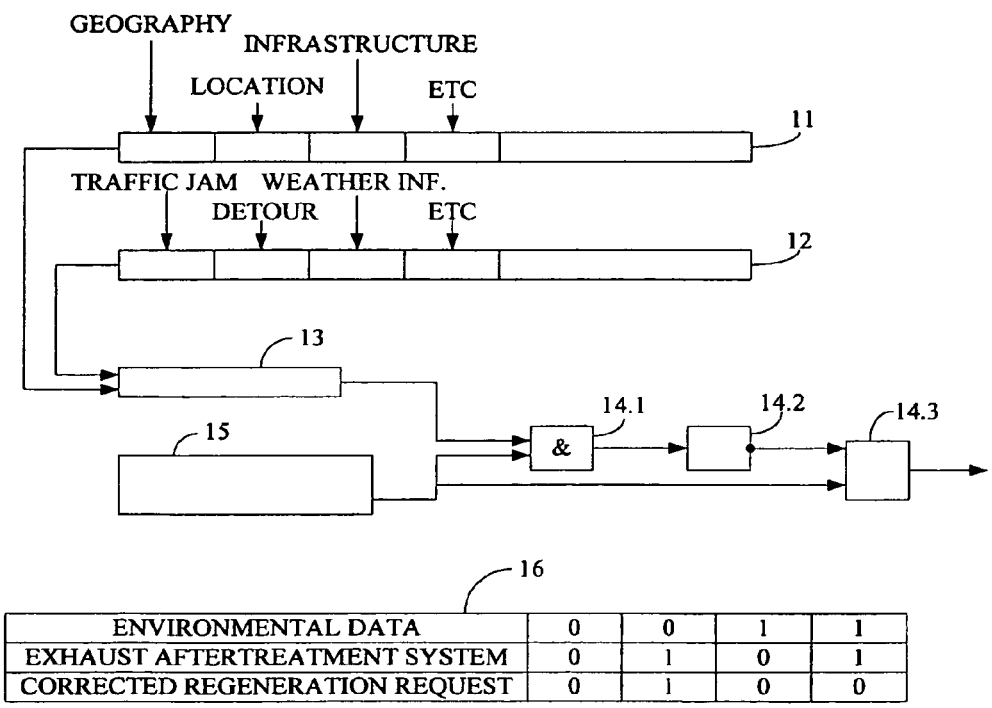
FIG. 2 shows an exemplary embodiment of a control unit of a control device shown in FIG. 1 having a state machine.

For example, information concerning the permissibility of the corresponding regeneration measures is sufficient. For example, as shown in FIG. 2, the transfer may be made in the form of a bit string 11 relating to the information of global positioning system 30 and/or a bit string 12 relating to the information of traffic telematics system 20. For example, a bit string 11 for the GPS information and a bit string 12 for the information of the traffic telematics are conceivable. If necessary, these two bit strings 11, 12 are logically linked in control device 10 or the engine control unit by a corresponding logic unit 13. If a truth value of the linked signals is present, a regeneration requested by exhaust aftertreatment system 1 according to an ANB request 15 is prevented. The truth values of the processing system configured in this way are found in a logic table 16. In order to prevent the regeneration requested by exhaust aftertreatment system 1, a corresponding logic gate 14.1 of a processing section 14 may be provided, for example. The output signal of logic gate 14.1 provided, for example, in the form of an AND, is supplied, via a negation gate 14.2, for example, to an additional logic gate 14.3, in the form of an AND, to which gate regeneration request 15 of exhaust aftertreatment system 1 is supplied as an additional input signal in order to generate a corrected regeneration request.

Present-day navigation systems in motor vehicles are generally used for route planning and guidance. Navigation systems which in addition to the roadmap also contain information concerning the terrain and accordingly uphill and downhill grades of roadways are of particular advantage in the present case. When the vehicle travels on an uphill grade, significantly higher exhaust gas temperatures are produced than when the vehicle travels on a level roadway or even on a downhill grade because uphill travel requires higher engine output. These higher exhaust gas temperatures may be used to regenerate a particulate filter in diesel-powered vehicles for example. If the exhaust gas temperature is not adequate for the regeneration, active measures must be employed in this case as well. However, the necessary temperature increase is lower than without the increased load due to the uphill grade of the roadway, making it possible to utilize the uphill grade in a positive manner for the regeneration.

A navigation system containing terrain information makes it possible to optimize the regeneration strategy, e.g., the selection of the point in time at which a regeneration of the particulate filter is initiated or which parameters are selected for the regeneration, a favorable stretch of road such as an uphill grade being foresightedly selected for the regeneration. After traveling a specific travel distance after which it is probable that a regeneration will be needed, this makes it possible to check if an uphill grade will be traveled on the planned route at not too great a distance. It is then possible to initiate the regeneration at just that location. Such a foresighted system makes it possible to significantly improve the regeneration strategy and the fuel consumption for the regeneration measures.

In principle, even without an input route, the navigation device could deliver information concerning the optimized operation of the exhaust aftertreatment system to the engine control unit or control device 10 by determining, for example, possible uphill stretches that will probably be approached from the position of the vehicle and the route. It will in turn be possible to trigger a regeneration at that location. In addition, it is possible to postpone the initiation of a regeneration operation to a later time if the information from control device 10 makes it predictable that the travel time required until the next downhill stretch is no longer adequate for a complete regeneration, since in a downhill stretch, the exhaust gas temperature drops because a lower engine output is required for operating the vehicle, i.e. the engine goes into overrun operation.

In addition, the navigation device may be used to prevent a filter regeneration from being initiated in a tunnel, for example. This is useful because substances might be produced during the regeneration of a particulate filter that would additionally pollute the air.

What is claimed is:

1. A method for regenerating an exhaust aftertreatment system of an internal combustion engine, situated in a vehicle, the method comprising:

supplying information relating to a travel distance to a control device, the information supplied from at least one of (1) a global positioning system and (2) a combination of the global positioning system and at least one of a traffic telematics system, a travel distance computer and a navigation system, wherein the information includes real time information; and controlling, by the control device, regeneration cycles as a function of the information, wherein the control device is coupled to at least one of the global positioning system, the traffic telematics system, the travel distance computer and the navigation system across a CAN bus, wherein:

the information includes a plurality of bit strings and the control device includes a logic unit such that the regeneration cycles may be controlled based on a logical processing of the bit strings, a first one of the plurality of bit strings relates to the information of the global positioning system, and a second one of the plurality of bit strings relates to the information of the traffic telematics system, wherein the information of the traffic telematics system includes at least information concerning traffic disturbances;

the first string and the second string are logically linked together via the logic unit, and truth values of the first string and the second string are stored in a logic table, by which a regeneration requested by the exhaust gas aftertreatment system, according to an exhaust gas aftertreatment request, is prevented, if necessary, via an additional logic element, and from which a corrected regeneration request is formed.

2. The method according to claim 1, wherein the exhaust aftertreatment system includes a particulate filter.

3. The method according to claim 1, further comprising extracting the information from more general travel distance data by one of the control device and a computational unit connected upstream.

4. The method according to claim 1, further comprising: determining, in the control device, as a function of the information, whether a regeneration operation, provided on the basis of a regeneration request of the exhaust aftertreatment system, is given priority or delayed; and modifying the regeneration cycle as a function of a result of the determination.

5. The method according to claim 1, further comprising determining, in the control device, as a function of the information, whether a modified regeneration operation is implemented.

6. The method according to claim 1, wherein the information contains data concerning at least one of: uphill grades, downhill grades, exhaust gas-critical stretches and traffic jams.

7. The method according to claim 6, wherein at least one of: (a) a higher temperature of the internal combustion engine on an uphill grade is included for a regeneration operation, and (b) a regeneration operation is at least one of delayed, given priority and shortened based on an optimization strategy in the case of one of an approaching downhill grade and an exhaust gas-critical stretch.

* * * * *